United States Patent
Dittmer et al.

(10) Patent No.: US 12,066,821 B2
(45) Date of Patent: Aug. 20, 2024

(54) MONITORING COMPONENTS OF MANUFACTURING APPLICATION SYSTEMS WITH RESPECT TO APPLICATION-SPECIFIC METRICS

(71) Applicant: Rockwell Automation Technologies, Inc., Mayfield Heights, OH (US)

(72) Inventors: Martin Dittmer, Karlsruhe (DE); Li Li, San Jose, CA (US); Abhijeet Singh, Bengaluru (IN); Jens Meissner, Karlsruhe (DE); Elaine M. Julius, Cary, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 327 days.

(21) Appl. No.: 16/904,241

(22) Filed: Jun. 17, 2020

(65) Prior Publication Data

US 2021/0149384 A1    May 20, 2021

Related U.S. Application Data

(60) Provisional application No. 62/937,042, filed on Nov. 18, 2019.

(51) Int. Cl.
  *G05B 23/02*    (2006.01)
  *G06F 11/30*    (2006.01)
  (Continued)

(52) U.S. Cl.
  CPC ........ *G05B 23/027* (2013.01); *G06F 11/3037* (2013.01); *G06F 11/327* (2013.01);
  (Continued)

(58) Field of Classification Search
  CPC .... G06F 11/3037; G06F 11/327; H04L 41/06; H04L 43/08; H04L 43/16
  (Continued)

(56) References Cited

U.S. PATENT DOCUMENTS

2005/0091002 A1* 4/2005 Krissell ............... G06F 11/3466
                                                  702/182
2018/0356800 A1  12/2018 Chao et al.
2019/0372859 A1* 12/2019 Mermoud ............... H04L 41/28

FOREIGN PATENT DOCUMENTS

WO    WO-2015188275 A1 * 12/2015 ............... C12Q 1/04

OTHER PUBLICATIONS

Extended European Search Report for Application No. 20205332.8 mailed Apr. 12, 2021, 9 pages.

* cited by examiner

*Primary Examiner* — Suraj M Joshi
(74) *Attorney, Agent, or Firm* — Fletcher Yoder, P.C.

(57) ABSTRACT

Systems and methods for monitoring components of a manufacturing application system (e.g., MES or MOM) with respect to application-specific metrics is provided. The MES may include software or a computer system used to monitor, control, and log processes employed to transform raw materials to products in an industrial automation system. The industrial automation system may include a monitoring system that receive a first set of data associated with application-specific metrics corresponding to the manufacturing application system as well as a second set of data from components associated with the manufacturing application system. The monitoring system may store a third set of data, in which the second set of data is organized with respect to the first set of data in a database. The monitoring system may analyze the organized data with respect to boundary conditions and provide alerts to a user or adjust operations associated with the components or the manufacturing application systems based on the components operating outside of the boundary conditions.

20 Claims, 5 Drawing Sheets

(51) Int. Cl.
  *G06F 11/32* (2006.01)
  *H04L 41/06* (2022.01)
  *H04L 43/08* (2022.01)
  *H04L 43/16* (2022.01)
(52) U.S. Cl.
  CPC .............. *H04L 41/06* (2013.01); *H04L 43/08* (2013.01); *H04L 43/16* (2013.01)
(58) Field of Classification Search
  USPC ........................................................ 714/25
  See application file for complete search history.

MONITORING COMPONENTS OF MANUFACTURING APPLICATION SYSTEMS WITH RESPECT TO APPLICATION-SPECIFIC METRICS

CROSS REFERENCE RELATED TO APPLICATIONS

This application claims priority from and the benefit of U.S. Provisional Application Ser. No. 62/937,042, entitled "MONITORING INFRASTRUCTURE OF MANUFACTURING APPLICATION SYSTEMS," filed Nov. 18, 2019. This U.S. Provisional Application is hereby incorporated by reference in its entirety for all purposes.

BACKGROUND

The present disclosure is directed to systems and methods for monitoring infrastructure of manufacturing application systems that are employed to connect to components (e.g., machines, sensors), monitor health parameters for the components, control data flows between components, and the like. More specifically, the present disclosure is related to monitoring data representative of the health or status of various components employed in the manufacturing application systems, such that the components are suitable for executing various types of operations that may be related to manufacturing or production in an industrial automation system.

The manufacturing application system may include any suitable information technology (IT) system that supports manufacturing processes. In some embodiments, the manufacturing application system may include a manufacturing execution system (MES) or a manufacturing operations management (MOM) system that may operate within an industrial automation system. The MES or MOM may include software or a computer system used to monitor, control, and log processes employed by components (e.g., machines, equipment) to transform raw materials into products in the industrial automation system. For instance, the MES or MOM may capture data regarding processes and outcomes of manufacturing processes that may be documented for reference later. Further, various types of information technology (IT) tools may monitor certain IT metrics for each of the components, but these tools often analyze component data without context to the type of application, industry, or operations being performed by the components. As such, to better assess health states for each of the components, it may be desirable to monitor data from components of the manufacturing application system with respect to application-specific metrics related to the context in which the components operate.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for monitoring one or more components of one or more manufacturing application systems with respect to application-specific metrics is provided. In accordance with this embodiment, a processor may receive a first set of data associated with the one or more application-specific metrics corresponding to the one or more manufacturing application systems. The processor may also receive a second set of data from the one or more components associated with the one or more manufacturing application systems. The processor may store a third set of data, in which the second set of data is organized with respect to the first set of data, in a database. The processor may analyze the third set of data with respect to one or more boundary conditions determined based on the one or more correlations between the first and second sets of data. The one or more boundary conditions may be associated with the one or more components operating according to one or more parameters monitored by the one or more manufacturing application systems. The processor may send one or more alerts to a computing device in response to the one or more components operating outside the one or more boundary conditions.

In a further embodiment, an industrial automation system may comprise a first set of data comprising one or more application-specific metrics corresponding to one or more manufacturing application systems; a second set of data from one or more components corresponding to the one or more manufacturing application systems, a database; and a monitoring system comprising a processor configured to execute computer-executable instructions stored on a non-transitory computer-readable medium. The computer-executable instructions, when executed, may cause the processor to receive the first set of data and the second set of data. The processor may store a third set of data, in which the second set of data is organized with respect to the first set of data, in a database. Further, the processor may analyze the third set of data with respect to one or more boundary conditions determined based on the one or more correlations between the first and second sets of data. The one or more boundary conditions may be associated with the one or more components operating according to one or more parameters monitored by the one or more manufacturing application systems. The processor may send one or more alerts to a computing device in response to the one or more components operating outside the one or more boundary conditions.

In an additional embodiment, a non-transitory computer-readable medium, may comprise computer-executable instructions. The computer-executable instructions, when executed by one or more processors, may cause the one or more processors to: receive a first set of data associated with one or more application-specific metrics corresponding to one or more manufacturing application systems and receive a second set of data from one or more components associated with the one or more manufacturing application systems. The processor may store a third set of data, in which the second set of data is organized with respect to the first set of data, in a database. Further, the processor may analyze the third set of data with respect to one or more boundary conditions determined based on the one or more correlations between the first and second sets of data. The one or more boundary conditions may be associated with the one or more components operating according to one or more parameters monitored by the one or more manufacturing application systems. The processor may send one or more alerts to a computing device in response to the one or more components operating outside the one or more boundary conditions.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
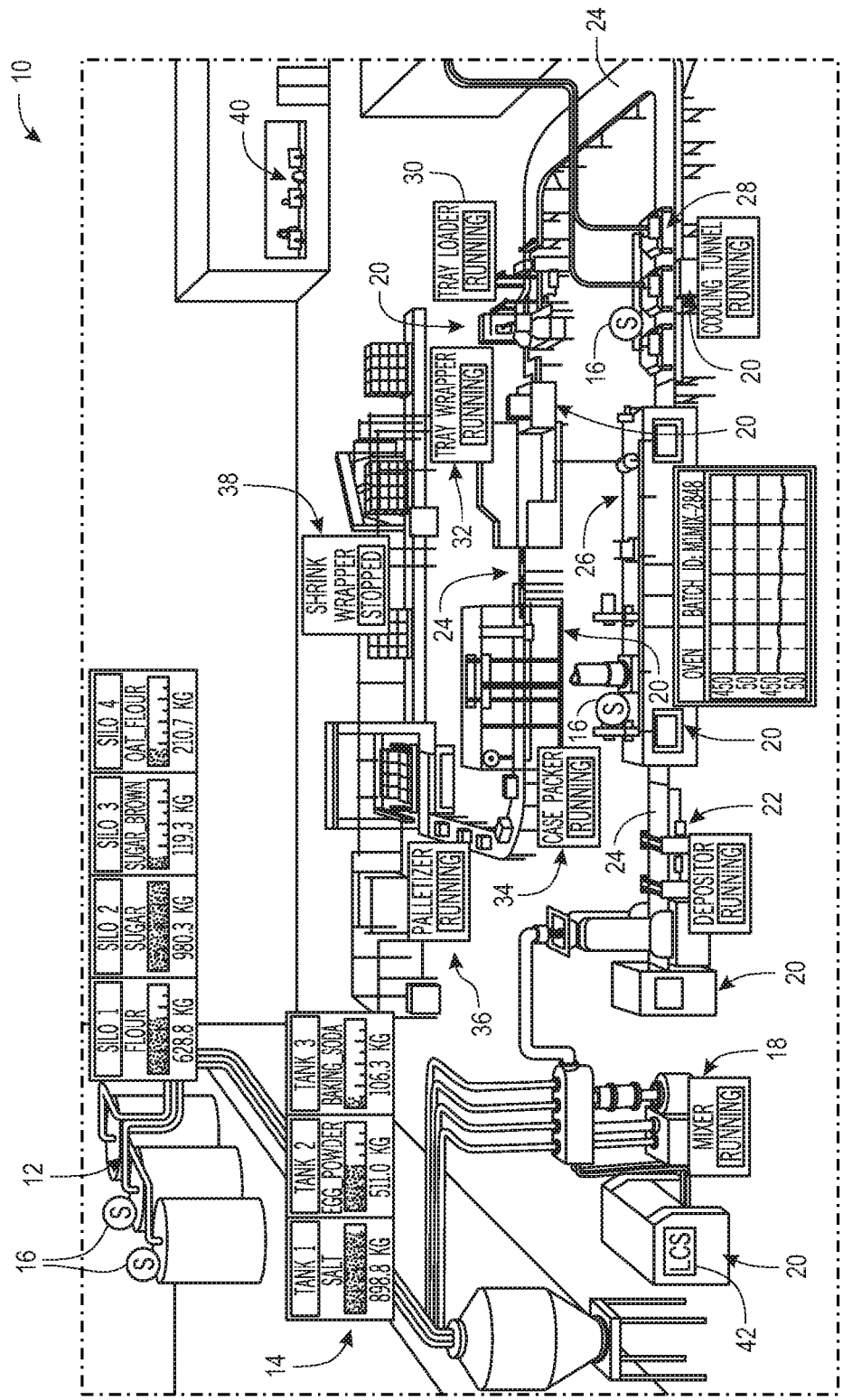
FIG. 1 illustrates an example industrial automation system employed by a food manufacturer, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification.

Industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump (e.g., component) to perform an oil extraction process. Although examples are provided with regard to specific contexts, one of ordinary skill in the art will recognize that these examples are not intended to be limiting and that the techniques described herein can be used with any suitable context.

To improve operation of industrial automation systems, performance of one or more components (e.g., machines, sensors) may be monitored with respect to the industrial automation process as a whole. A monitor system may analyze various datasets received from various components in the industrial automation system with respect to a particular context (e.g., processes being performed, products being manufactured, raw material being used, computing resources being used) in which the components operate or how the overall system is operating. In other words, the stored datasets are analyzed according to one or more application-specific metrics that may encompass production output, available memory, associated time delays, and the like.

The industrial automation system may include a number of hierarchical levels for enterprise integration. By way of example, an enterprise resource planning (ERP) system, a manufacturing application system (e.g., MES or MOM), a device control system, and components may operate within the industrial automation system. The MES may include software or a computer system used to monitor, control, and log processes employed to transform raw materials to products in the industrial automation system. As mentioned above, various types of information technology (IT) tools may monitor certain IT metrics for each of the components, but these tools often analyze data without context to the type of application, industry, or operations being performed by the components.

With this in mind, in some embodiments, an aggregate monitoring system may receive datasets from multiple manufacturing application systems and respective data from various components that are a part of each manufacturing application system. The data may include log files that record events or that occur in software or hardware components (e.g., machines, sensors) that are part of each manufacturing application system. In addition to collecting data from the components of each manufacturing application system, the aggregate monitoring system may also receive data corresponding to application-specific metrics or system health characteristics (e.g., lag time, memory, processing power usage) of each manufacturing application system or components in each manufacturing application system.

The aggregate monitoring system may organize data from the components with respect to various application-specific metrics for each manufacturing application system. The organized data for each manufacturing application system may be stored in an application-specific time-series database to provide more efficient querying operations of the organized data and trend analyses. As data is continuously collected in the application-specific time-series database, the aggregate monitoring system may identify boundary conditions for operating various components based on relationships between the collected data from the components and the application-specific metrics for each manufacturing application system. Boundary conditions may be defined as quantitative metrics associated with disk space, lag time, processing power, or any suitable parameter.

After the aggregate monitoring system receives log files from the application-specific time-series database, the aggregate monitoring system determines whether data (e.g., log files) from the application-specific time-series database are within the identified boundary conditions. In some embodiments, if the data from the application-specific time-series database is below or above a threshold of the identified boundary conditions, then the aggregate monitoring system may send alerts associated with the boundary conditions to a computing device of a user. In other embodiments, the aggregate monitoring system may notify a user if a particular boundary condition is being approached or may adjust operations of the components to avoid approaching or passing the boundaries. By adjusting the operations of the components and manufacturing application system, the aggregate monitoring system may effectively regulate performance factors and/or health indicators of the industrial automation system.

By way of introduction, FIG. 1 illustrates an example industrial automation system 10 employed by a food manufacturer in which the present embodiments may be implemented. It should be noted that although the example industrial automation system 10 of FIG. 1 is directed at a food manufacturer, the present embodiments described herein may be employed within any suitable industry, such as automotive, IT, mining, hydrocarbon production, manufacturing, and the like. The following brief description of the example industrial automation system 10 employed by the food manufacturer is provided herein to help facilitate a more comprehensive understanding of how the embodiments described herein may be applied to components and a manufacturing application system to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, firewall, network switches (e.g., Ethernet switches, modular-managed, fixed-managed, service-router, industrial, unmanaged, etc.) and the like. The industrial automation devices 20, the mixer 18, and other machines are examples of components in the industrial automation system 10.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

The industrial automation devices 20 (e.g., components) may be used to provide power to the machinery used to perform certain tasks, provide protection to the machinery from electrical surges, prevent injuries from occurring with human operators in the industrial automation system 10, monitor the operations of the respective device, communicate data regarding the respective device to an aggregate monitoring system 40, and the like. In some embodiments, each industrial automation device 20 or a group of industrial automation devices 20 may be controlled using a local monitoring system 42. The local monitoring system 42 may include receive data regarding the operation of the respective industrial automation device 20, user inputs, and other suitable inputs to control the operations of the respective industrial automation device 20.

The aggregate monitoring system 40 and the local monitoring system 42 may include a human machine interface (HMI) and a control/monitoring device or automation controller adapted to interface with devices that may monitor and control various types of industrial automation devices 20 or components. It should be noted that the HMI and the control/monitoring device, in accordance with embodiments of the present techniques, may be facilitated using certain network strategies. Indeed, an industry standard network may be employed, such as DeviceNet, to enable data transfer. Such networks permit the exchange of data in accordance with a predefined protocol and may provide power for operation of networked elements.

In certain embodiments, the industrial automation devices 20 (e.g., components) may include a communication feature that enables the industrial automation devices 20 (e.g., components) to communicate data between each other and other devices. The communication feature may include a network interface that may enable the industrial automation devices 20 (e.g., components) to communicate via various protocols such as Ethernet/IP®, ControlNet®, DeviceNet®, or any other industrial communication network protocol. Alternatively, the communication feature may enable the industrial automation devices 20 (e.g., components) to communicate via various wired or wireless communication protocols, such as Wi-Fi, mobile telecommunications technology (e.g., 2G, 3G, 4G, LTE, 5G), Bluetooth®, near-field communications technology, and the like.

In certain embodiments, the aggregate monitoring system 40 may be communicatively coupled to a computing device and/or a cloud-based computing system of a user. In this network, input and output signals generated from the aggregate monitoring system 40 may be communicated between the computing device and/or the cloud-based computing system. In certain embodiments, the aggregate monitoring system 40 may perform certain operations and analysis without sending data to the computing device and/or the cloud-based computing system.

Figure 2:
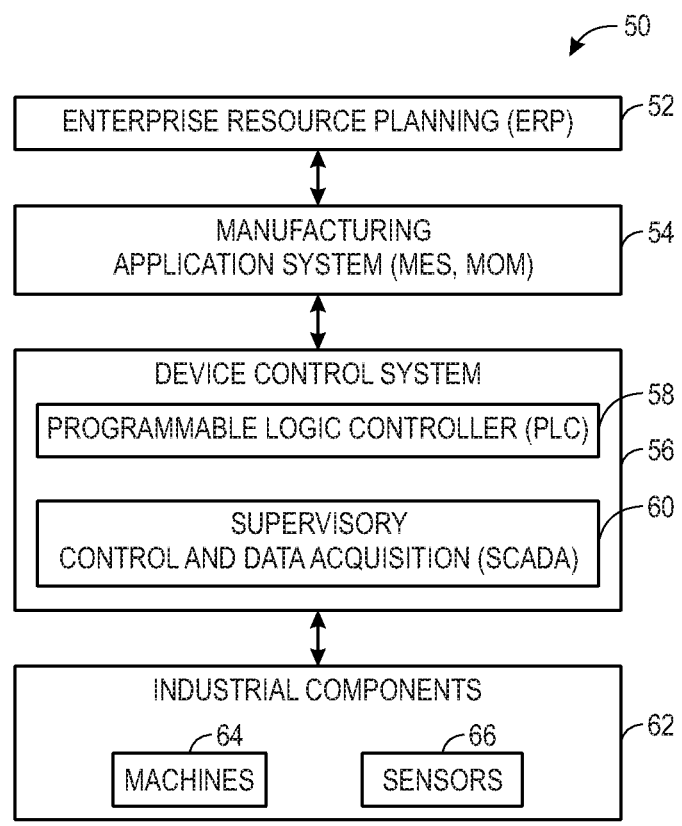
FIG. 2 illustrates hierarchical levels of the industrial automation system, in accordance with an embodiment of the present discourse.

The aggregate monitoring system 40 and the local monitoring system 42 may be a part of the MES or MOM of the industrial automation system 10. As mentioned above, the MES or MOM may include software or a computer system used to monitor, control, and log processes employed to transform raw materials to products in the industrial automation system 10. By way of reference, the MES may operate within one of a number of hierarchical levels for enterprise integration, and FIG. 2 depicts the hierarchical levels 50, in which the industrial automation system 10 may operate. Different control systems, controllers, software applications, devices, and computing systems may operate with each other within an enterprise to enable organizations to effectively monitor and control operations of components in the industrial automation system 10. For example, the physical process in which industrial components 62 (e.g., machines 64) are employed to physically modify raw materials may be part of the physical process level, which may be controlled or monitored by components in an intelligent device level. The intelligent device level may include sensors 16, analyzers, actuators, and other instrumentation that may sense and manipulate the physical process. The industrial components 62 at both the physical process level and the intelligent device level may be a part of industrial component level. In some embodiments, the sensors 16, analyzers, actuators, and other instrumentation may be classified as industrial automation devices 20. The industrial component level involves the actual production process of transforming raw materials (e.g., grains, wheat) into products (e.g., cereal) as well as sensing and manipulating the production process.

A device control system level may be positioned at a higher hierarchical level with respect to industrial component level. The device control system 56 may provide supervising, monitoring, and controlling operations (e.g., continuous control, discrete control) for the physical process associated with the industrial components 62. By way of examples, the device control system 56 may include real-time control hardware and software, HMI, programmable logic controller (PLC) 58, supervisory and data acquisition (SCADA) software 60, and the like. The PLC 58 may be an industrial solid-state computer that monitors inputs and outputs of the industrial automation system 10 and makes logic-based decisions for automated processes of the industrial automation system 10. Further, the SCADA 60 may analyze real or near real-time data from industrial components 62 and subsequently control the industrial components 62.

Manufacturing application system level may be positioned at a higher hierarchal level with respect to the device control system level. As mentioned previously, the manufacturing application system 54 may include any suitable IT system that supports manufacturing processes. In some embodiments, the manufacturing application system 54 may include MES or MOM that manage production workflow to produce the desired products, batch management, laboratory, maintenance and plant performance management systems, data historians, related middleware, and the like. The MES and MOM may involve monitoring data with respect to various time frames, such as work shifts, hours, minutes, seconds, and the like.

In particular, the MES may include a number of software and hardware components that operate together to monitor the operations of the various components (e.g., databases, servers, devices) that are used to perform the manufacturing operations. The infrastructure of the manufacturing applications system 54, such as MES, may include the software and hardware components that control the distribution of data and information between various components in the manufacturing application system level and other levels discussed above. By way of example, the components of the manufacturing application system 54 may include a server, a database, a database server, an application server, network controllers, routers, interfaces, and the like. In addition, the components of the manufacturing application system 54 may include software applications and processes that operate to control the flow of data and information between the various components employed by the manufacturing applications systems.

Positioned above the manufacturing operations system level, a business logistics system level may manage business-related activities of the manufacturing operation. For instance, enterprise resource planning (ERP) system 52 may establish production schedule, material use, shipping, and inventory levels to support the operations monitored by the components (e.g., databases, servers) in the manufacturing application system level 56.

Figure 3:
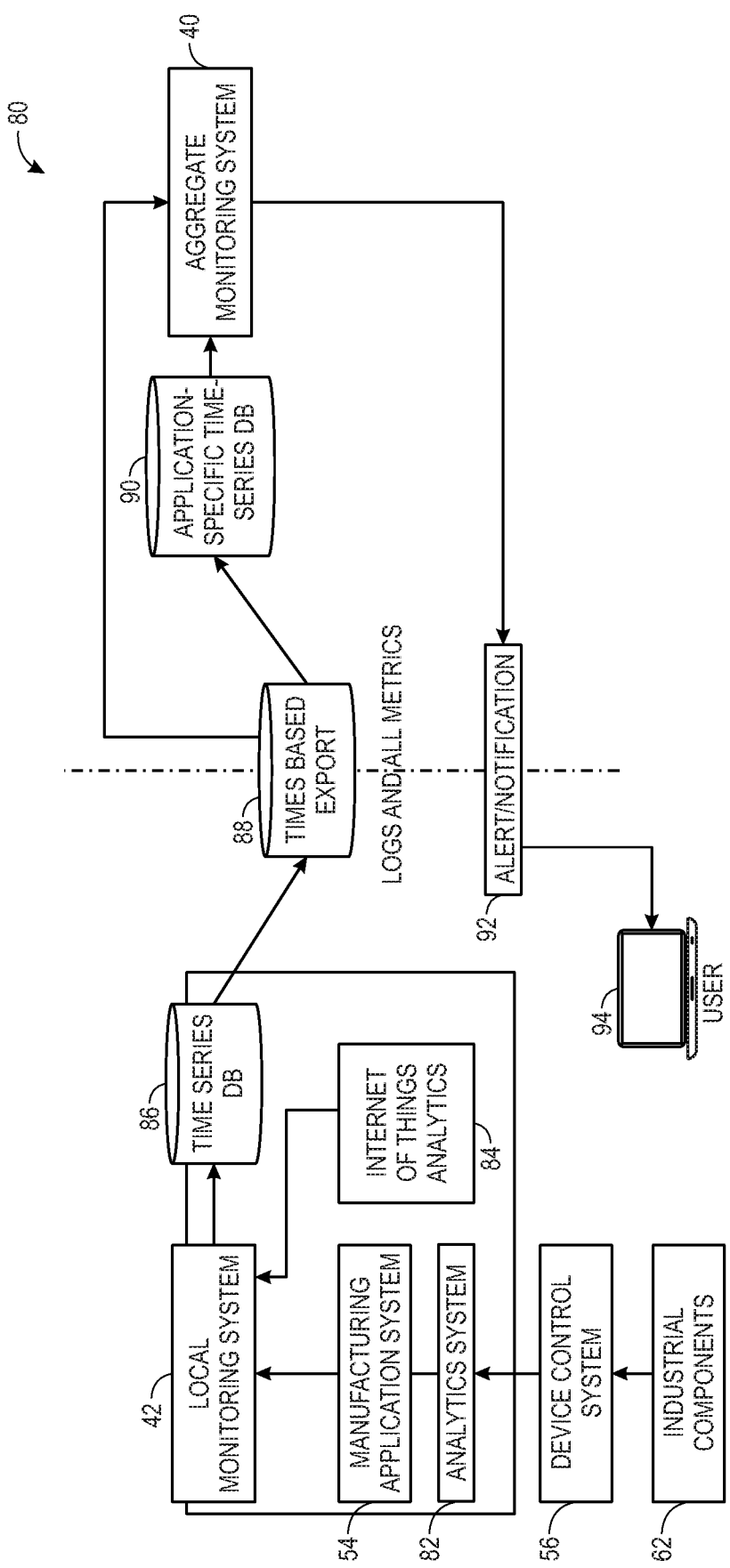
FIG. 3 illustrates a system that monitors data from components with respect to application-specific metrics of the industrial automation system, in accordance with an embodiment of the present disclosure.

As mentioned above, IT metrics or characteristics of industrial components 62 may be monitored without context to the type of application, industry, or operations being performed by the industrial components 62. As such, to better assess health states for each of the industrial components 62, it may be desirable to monitor data from the industrial components 62 of the industrial automation system 10 with respect to application-specific metrics. In turn, FIG. 3 depicts a system 80 that monitors data from the industrial components 62 with respect to application-specific metrics of the industrial automation system 10. The system 80 may include the aggregate monitoring system 40 and the local monitoring system 42, which are referenced in FIG. 2. The local monitoring system 42 may receive data from industrial components 62 of a particular manufacturing application system 54 (e.g., MES or MOM), as well as operations that may be performed by the industrial components 62 or application-specific metrics associated with the manufacturing application system 54. For example, analytics system 88 may collect data from controllers (e.g., PLC 58, SCADA 60) of the device control system 56, which monitor data from the industrial components 62 (e.g., machines 64, sensors 66) data. The analytics system 88 may convert the data received from the controllers of the device control system 56 into appropriate forms (e.g., log files) before sending the data to the local monitoring system 42.

In addition to collecting data from the industrial components 62, the analytics system 88 may also receive data related to an application or operation that represents the processes being monitored or controlled by the manufacturing application system 54. That is, MES and MOM may be part of the manufacturing application system level described above, while the industrial component level may be related to the physical processes that are performed by the industrial automation system 10 to manufacture certain products, generate certain components, or the like. The data related to the application-specific metrics and operations being performed by the industrial component level may be provided to the local monitoring system 42. For example, in systems that perform certain physical processes, such as manufacturing medicinal tablets according to a particular recipe, the local monitoring system 42 may receive data related to the number of parallel orders related to manufacturing the medicinal tablets. The number of parallel orders related to manufacturing the medicinal tablets may refer to a number of applications or operations that may be performed simultaneously by the industrial components 62 (e.g., machines 64) using components (e.g., databases, servers) in the manufacturing application system 54.

The system 80 also includes Internet of Things (IoT) data analytics component 84, which allows the local monitoring system 42 to collect and analyze data from the industrial components 62 (e.g., sensors 66) disposed on manufacturing equipment, pipelines, and other types of machinery. After the local monitoring system 42 receives data from the industrial components 62 and data related to application-specific metrics of the manufacturing application system 54, the local monitoring system 42 may send both sets of data to time-series database 84, which may store both sets of data with respect to a time in which the data was collected. In some embodiments, the time-series database 84 may export the data as log files 88 to another database, to other components, or the like.

For example, the log files 88 may be retrieved by the aggregate monitoring system 40. That is, the aggregate monitoring system 40 may continuously receive datasets corresponding to various manufacturing application systems 54 and respective industrial components 62 via the log files 88. Each time the local monitoring system 40 receives data from industrial components 62 and corresponding application-specific metrics from the manufacturing application system 54, the data is collected by the aggregate monitoring system 40. In other words, the local monitoring system 42 collects data corresponding to a single manufacturing application system 54. In some embodiments, the industrial automation system 10 may include 15, 30, 60, and any suitable number of production sites each associated with multiple application servers and processes. As a result, the aggregate monitoring system may collect data from a number of manufacturing application systems 54 and may include a history or record of the data collected by the local monitoring system 42.

The aggregate monitoring system 40 may organize the data from the industrial components 62 with respect to application-specific metrics for each manufacturing application system 54. Indeed, each different type of application of the related manufacturing application system 54 may be associated with different performance factors and/or health indicators. For example, various types of applications include the amount of time that an order takes to execute via the industrial components 62, metrics related to the ability of the industrial components 62 to perform respective operations, and the like. In some embodiments, the local monitoring system 42 and the aggregate monitoring system 40 may collect and store application-specific metrics or operational data (e.g., memory, processor usage, hard disk storage, latency) related to the operations of the industrial components 62 during different stages of production or types of input parameter implementations for the application-specific process performed by the respective manufacturing application system 54.

The aggregate monitoring system 40 may store the organized data in an application-specific time-series database 90. Storing the organized data in an application-specific time-series database 90 provides improved querying operations for the data and improved trend analyses. That is, by analyzing collected data with respect to particular time periods or operational statuses, the aggregate monitoring system 40 may correlate certain operational issues (e.g., slowdown, low memory, increased latency) of certain industrial components 62 to certain input parameters (e.g., number of orders, parallel orders, speed, number of users) that are associated with the industrial components 62. The common time-based storage of collected data, which may include systems metrics health data, as well as log data, may allow the aggregate monitoring system 40 to correlate adverse events or establish boundary conditions to other data points stored in the time series database to better ascertain a possible cause for the adverse event or boundary condition. As mentioned above, boundary conditions may be defined as threshold conditions (e.g., maximum or minimum values) associated with operating parameters of the industrial component 62 in its corresponding manufacturing application system 54. Adverse events may occur when the industrial component 62 begin to operate outside the boundary conditions, which may correspond to causing the industrial component 62 to operate less efficiently or disable.

Referring back to the example regarding manufacturing of medicinal tablets discussed above, based on previous operations of the industrial components 62 in the manufacturing application system 54, the aggregate monitoring system 40 may determine boundary conditions with regards to, for example, a minimum number of parallel orders that are performed and a maximum number of parallel operations that are performed by the industrial components 62. The number of parallel orders may refer to the number of applications or operations that the industrial components 62 (e.g., machines 64) may be performing simultaneously in the manufacturing application system 54 to produce medicinal tablets. In addition to the instances in which parallel operations are performed, the aggregate monitoring system 40 may retrieve log files that describe health or operational parameters for each of the industrial components 62 during time periods that correspond to the various numbers of parallel orders that are performed. In some embodiments, the boundary conditions may be identified based on memory limitations of the industrial components 62, processing time delays by the industrial components 62, and other suitable metrics that measure the effectiveness and efficiencies of the industrial components 62 performing its respective tasks in the manufacturing application system 54.

As mentioned above, if the data from the application-specific time-series database 90 indicates that the industrial components 62 fail to operate with respect to the manufacturing application system within a threshold of the identified boundary conditions, then the aggregate monitoring system 40 may send alerts or a notification 92 associated with the boundary conditions to a user device 94 (e.g., mobile computing device) of a user. In other embodiments, the aggregate monitoring system 40 may notify a user if a particular boundary condition is being approached or may proactively prevent certain operations (e.g., adjusting operations of the industrial components 62 or manufacturing application system 54) from being performed to prevent the particular boundary condition from being approached. In addition, the aggregate monitoring system 40 may adjust operations of the industrial components 62 and the manufacturing application system 54 to effectively regulate performance factors and/or health indicators of the industrial automation system in view of the boundary conditions.

In a similar manner to boundary conditions, the aggregate monitoring system 40 may analyze trends of the data with respect to time to predict that an event may occur based on the log data 88 stored in the application specific time-series database 90. In addition, predictive analysis may result in the aggregate monitoring system 40 generating recommendations for resolving potential future events before they are likely to occur. For instance, the aggregate monitoring system 40 may recommend increasing the number of industrial components 62 used by the manufacturing application system 54 after determining that the trend analysis indicates that the industrial components 62 may exhaust their memories within some amount of time given the increase in operations over a period of time. It should be noted that since each of the analysis is performed within the context of the application-specific metrics of the corresponding manufacturing application system 54, the aggregate monitoring system 40 provides more accurate analysis, as compared to generic monitoring operations.

The analysis performed by the monitor system may thus collect meaningful metrics regarding the operations of the industrial components 62 in the manufacturing application system 54 since the data is collected and analyzed with respect to application-specific metrics. As mentioned previously, application-specific metrics may include production output, available memory, associated time delays, and other operations or applications associated with the performance of the industrial components 62 in the manufacturing application system 54 or how the overall manufacturing application system 54 is operating. In particular, the aggregate monitoring system 40 may send alerts that cause an application executed on the user device 94 to open and display a visualization representative of a detected event or boundary condition, a predicted event, or other key performance indicators that are driven based on application-specific metrics being implemented by the corresponding manufacturing application system 54. As further discussed below, in certain embodiments, machine learning may be used to perform trend analyses and identify boundary conditions based on correlations between the data from the industrial components 62 and application-specific metrics corresponding to the manufacturing application system 54.

Figure 4:
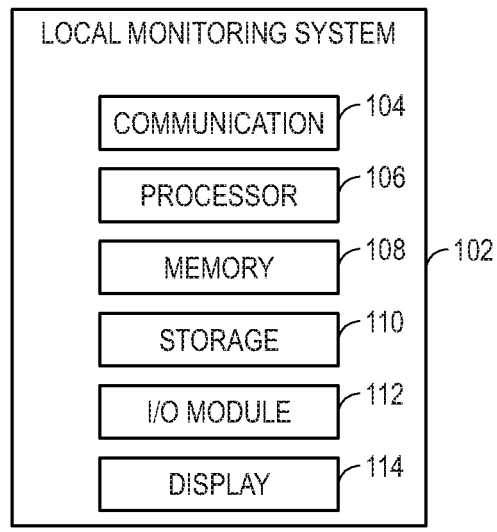
FIG. 4 illustrates example elements that are a part of a monitoring system in the industrial automation system, in accordance with an embodiment of the present disclosure.

With the preceding in mind, FIG. 4 illustrates example elements that may be part of a monitoring system 102, in accordance with embodiments presented herein. The monitoring system 102 may include the aggregate monitoring system 40 and/or the local monitoring system 42. For example, the monitoring system 102 may include a communication component 104, a processor 106, a memory 108, a storage 110, input/output (I/O) module 112, a display 114, and the like. The communication component 104 may be a wireless or wired communication component that may facilitate communication between the monitoring system 102 and other electronic devices.

The memory 108 and the storage 110 may be any suitable articles of manufacture that can serve as media to store processor-executable code, data, or the like. These articles of manufacture may represent computer-readable media (i.e., any suitable form of memory or storage) that may store the processor-executable code used by the processor 106 to perform the presently disclosed techniques. In some embodiments, the memory 108 may include a volatile data storage unit, such as a random-access memory (RAM) and the storage 110 may include a non-volatile data storage unit, such as a hard disk. The memory 108 and the storage 110 may also be used to store the data, analysis of the data, and the like. The memory 108 and the storage 110 may represent non-transitory computer-readable media (i.e., any suitable form of memory or storage) that may store the processor-executable code used by the processor 106 to perform various techniques described herein. It should be noted that non-transitory merely indicates that the media is tangible and not a signal.

The monitoring system 102 may also include the input/output (I/O) module 112. The I/O module 112 may enable the monitoring system 102 to communicate with various devices in the industrial automation system 10. Input/output (I/O) module 112 may be added or removed from the monitoring system 102 via expansion slots, bays or other suitable mechanisms. In certain embodiments, the I/O modules 112 may be included to add functionality to the monitoring system 102, or to accommodate additional process features. For instance, the I/O module 112 may communicate with new sensors 16 or actuators added to monitor and control of the industrial components 62 (e.g., the industrial automation devices 20). It should be noted that the I/O modules 112 may communicate directly to sensors 16 or actuators 60 through hardwired connections or may communicate through wired or wireless sensor networks, such as Hart or IOLink.

Generally, the I/O modules 112 serve as an electrical interface to the monitoring system 102 and may be located proximate or remote from the monitoring system 102, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems. Several of the I/O modules 112 may transfer input and output signals between the monitoring system 102 and the industrial components 62.

The monitoring system 102 may be equipped with the display 114. The display may provide a user with information about the data received via the communication component 32. The information may include data received from the monitoring system 102 and may be associated with various industrial components 62. The display 114 may also be used by a user to provide input to the monitoring system 102, such as defining data models with the respective data structures querying for specific data to be collected from the various industrial components 62 of the industrial automation system 10, among other things.

The monitoring system 102 (e.g., the aggregate 40 and the local 42 monitoring devices) may be implemented as a single computing system or multiple computing systems. The computing systems associated with the monitoring system 102 may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the monitoring system 102 as a physical device, implementations are not so limited. In some examples, the monitoring system 102 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Figure 5:
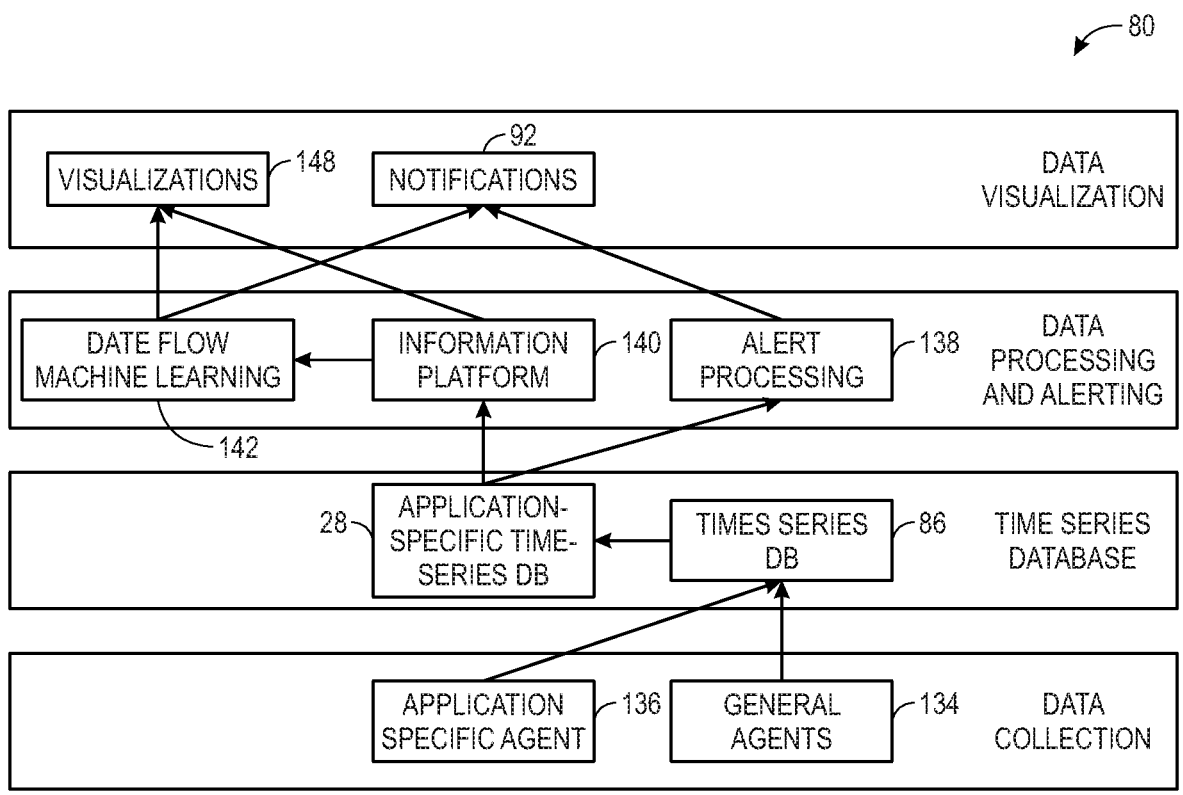
FIG. 5 is a block diagram of example elements of the system illustrated in FIG. 3, in accordance with an embodiment of the present disclosure.

With the foregoing in mind, FIG. 5 provides additional details with regard to elements of the system 80 described in FIG. 3 above. In some embodiments, the monitoring system 102 may include application-specific agents 136 and general agents 134 that perform the data collection operations for the monitoring system 102. The general agents 134 may collect data related to certain IT parameters, while the application-specific agents 136 may probe into specific industrial components 62 and retrieve data that is relevant to application-specific metrics or operations being performed by the manufacturing application system 54. For example, the general agents 134 may collect data related to certain IT parameters such as lag time, processing power, memory resources, and the like. Referring to the medicinal tablet example discussed in FIG. 3, the application-specific agent 136 may retrieve data related to the number of parallel orders (e.g., the number of operations that the industrial components 62 may perform simultaneously to produce medicinal tablets), which serves as an application-specific metric related to manufacturing the medicinal tablets. In some embodiments, the agents 134 and 136 may push retrieved data from the local monitoring system 42 into the time series database 86. The retrieved data may include log files that detail various operational parameters (e.g., CPU, memory, disk usage, throughput, heap size, thread count, hypertext transfer protocol (HTTP) request count, number of transactions per second, average response time, JDBC connection count, garbage collector, amount of order, parallel unit procedure) of the respective industrial components 62. In a further embodiment, the agents 134 and 136 may send the exported data (e.g., log files) from the time-series database 86 to the aggregate monitoring system 40 as described in FIG. 3. In addition, the agents 134 and 136 may push organized data from the aggregate monitoring system 40 the application-specific time-series database 90.

The time-series database 86 stores data associated with a particular manufacturing application system 54 and data from corresponding industrial components 62. In contrast, the application-specific time-series database 90 stores data for multiple manufacturing applications systems 54. In fact, the application-specific time-series database serves as a record or history of the manufacturing application systems 54 collected by the time-series database 86. Each time the time-series database collects data from components and related to application-specific metrics, that data is sent to the application-specific time-series database 90 as well. After the aggregate monitoring system 40 collects data from the time-series database 86, organizes the data, and pushes the data to the application-specific time-series database, the data stored in the application-specific time-series database may be processed and analyzed to determine whether any events are present or likely to occur.

As discussed above, if the data from the application-specific time-series database indicates that the industrial components 62 fail to operate with respect to the manufacturing application system within a threshold of the identified boundary conditions, then the aggregate monitoring system 40 may initiate alert processing component 138. That is, the alert processing component 138 may send a notification 92 associated with an alert that a boundary condition has been approached to a user, which may receive a notification via a user device 94. In some embodiments, the notification 92 may include a message, email, link to a description of the alert, or the like. The notification 92 may cause the user device 94 to automatically display the details of the notification 94, open an application stored on the user device 94, annunciate an audible, visual, or haptic alert, or perform any other suitable operation to notify the user of this time-sensitive information. As such, the user device 94 may include any suitable type of computing device. In some instances, the user device 94 is a portable computing device such as a smartphone, tablet computer, wearable device, implanted computer, automotive computer, portable gaming platform, and so forth. In some embodiments, the user device 94 may also be a less portable type of computing device, such as a desktop computer, laptop computer, game console, smart appliance, and so forth.

In some embodiments, the notification 92 may be rendered on a particular graphical user interface (GUI) of the user device 94. An example dashboard of the GUI may include categories for component name (e.g., database) of the manufacturing application system 54, corresponding server name of the manufacturing application system 54, and threshold duration in seconds. Another example dashboard may include categories for the industrial component 62 (e.g., disk, CPU, memory, network of machine 64), control limits (e.g., recommend operating parameters or limits) corresponding to the industrial component 62, warning limits corresponding to the industrial component 62 based on identified boundary conditions, threshold durations (e.g., seconds) based on the control limit, threshold durations (e.g., seconds) based on the warning limit, and the like. Options to refresh the data, edit the data, import the data, export the data, apply a configuration to the data, and the like may be available on the various dashboards of the GUI. In some embodiments, the data in the dashboards may be represented as images, charts, graphs, and the like.

The data that has been organized by the aggregate monitoring system 40 may be exported as log files and the like from the application-specific time-series database 90 to an information platform component 140 so that the aggregate monitoring system 40 may perform further analysis using the organized data. For example, machine learning component 142 may be used to perform trend analyses and identify boundary conditions based on correlations between the data from the industrial components 62 and application-specific metrics corresponding to the manufacturing application system 54. Machine learning circuitry (e.g., circuitry used to implement machine learning logic) may access the data stored in the universal fields of information platform 140 to identify patterns of the data. Because data is provided from a multitude of diverse online services, new data patterns not previously attainable may emerge. As used herein, the machine learning component 142 may include circuitry or software that implements certain algorithms and/or statistical models that computer systems may use to perform specific tasks without using explicit instructions, relying instead on patterns and inference instead. In one example, the machine learning component 142 may generate a mathematical model based on sample data, known as "training data", in order to make predictions or decisions without being explicitly programmed to perform the task.

Predictions related to approaching boundary conditions or when an adverse event may occur may be derived by the machine learning circuitry or software. For example, groupings, correlations, and/or other classifications based on operations of the industrial components 62 in a manufacturing application system 54 may be identified. The data predictions may be provided to the aggregate monitoring device 40, which may perform actions based upon the data predictions. In addition, the data predictions may result in the aggregate monitoring system 40 generating recommendations for resolving potential future events before they are likely to occur. In some embodiments, particular GUI features or visualizations 148 may be rendered on the user device 94 and/or the aggregate monitoring device 40 based upon the data predictions and recommendations. Further, particular application features/functions on the GUI may be enabled based upon the data predications, recommendations, and the like. This may greatly enhance user experiences by notifying users when an issue may arise or a boundary condition may be approached based on performing machine learning component 142 using the application-specific metrics and the data collected from the industrial components 62 at earlier times or from other components that are part of separate manufacturing application systems 54.

Depending on the predictions to be made, the machine learning circuitry or software may implement different forms of machine learning. For example, in some embodiments (e.g., when known examples exist that correlate to future predictions that machine learning circuitry will be tasked with generating) supervised machine learning may be implemented. In supervised machine learning, the mathematical model of a set of data contains both the inputs and the desired outputs. This data is referred to as "training data" and is essentially a set of training examples. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression algorithms and has applications in ranking, recommendation systems, visual identity tracking, face verification, and speaker verification.

Additionally and/or alternatively, in some situations, it may be beneficial for the machine-learning circuitry/software to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

Based on the data gleaned from the machine learning component 142, the aggregate monitoring system 40 may better assess the operating status (e.g., healthy, low memory, increased lag time) of the related industrial components 62. In addition, the aggregate monitoring system 40 may adjust operations of the industrial components 62 or the manufacturing application system 54 to prevent boundary conditions from being approached.

In some embodiments, the general agents 134, the application-specific agents 136, the time-series database 86, the application-specific time-series database 90, the information platform 140, and the machine learning component 142 may serve as software components or may be implemented as hardware components within the system 80. In additional embodiments, the general agents 134, the application-specific agents 136, the time-series database 86, the application-specific time-series database 90, the information platform 140, and the machine learning component may be stored on a single machine or computing system or dispersed across multiple machines or computing systems.

Figure 6:
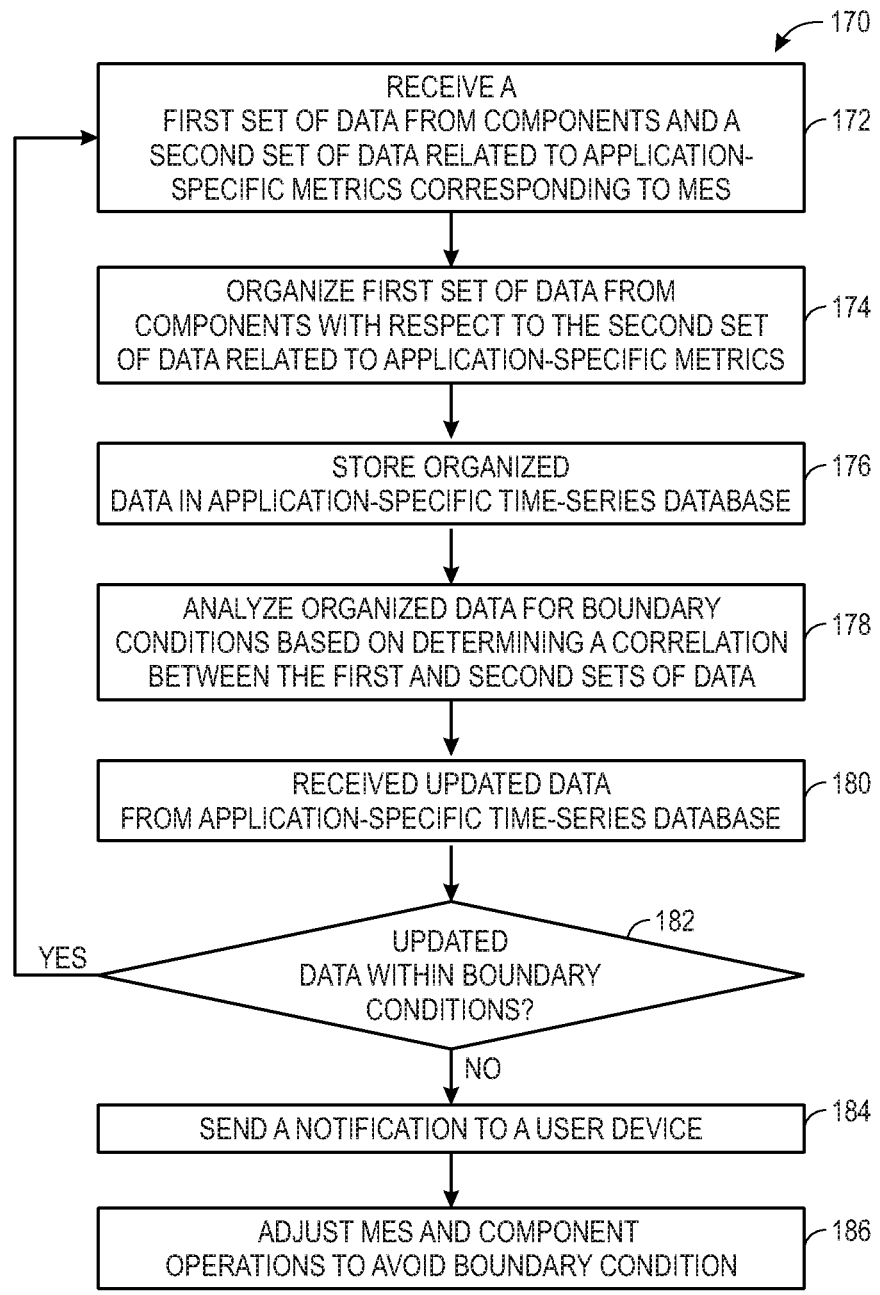
FIG. 6 is a flowchart of a method for monitoring the industrial automation system, in accordance with an embodiment of the present disclosure.

Referring to FIG. 6, a flowchart of a method 170 for monitoring the industrial components 62 is illustrated. Although the following description of the method 170 will be discussed as being performed by the aggregate monitoring system 40, it should be noted that any suitable computing component may perform the method 170. In addition, the method 170 is described in a particular order, but it should noted that the method 170 may be performed in any suitable order.

Referring now to FIG. 6, at block 172, the aggregate monitoring system 40 may receive a first set of data from the industrial components 62 and a second set of data related to application-specific metrics corresponding to a manufacturing application system 54 (e.g., MES). As mentioned previously, both sets of data collected by the aggregate monitoring system 40 is based on retrieved the log files and the like for each MES exported from the time-series database 86. The aggregate monitoring system 40, which collects data associated with multiples MES, may continuously retrieve both sets of data as new data associated with a particular MES is collected by the local monitoring system 42, pushed to the time-series database 86, and exported from the time-series database 86.

Based on retrieving both sets of exported data for each MES, the aggregate monitoring system 40 may organize the data from the industrial components 62 with respect to application-specific metrics for each manufacturing application system 54 (block 174). For example, the aggregate monitoring system 40 may identify different operating parameters or conditions that are present for each manufacturing application system 54 and associate corresponding data received from the industrial components 62 with each operating parameter or condition. Indeed, each different type of application of the related MES may be associated with different performance factors and/or health indicators.

At block 176, the aggregate monitoring system 40 may store data that is organized in an application-specific time-series database 90. In the application-specific time-series database 90, the data may be organized or categorized based on respective table, column, and row names. For example, data from a particular industrial component 62 may be stored in a particular column based on determining that the name of the particular column is associated with the data from the industrial component 62. In some embodiments, application-specific tags or identifiers may be used to correlate the data from the industrial components 62 and the data related to application-specific metrics from the manufacturing application system 54 (e.g., server name). Further, particular database instances may be associated with different types of data (e.g., alerts, server metrics, server logs, client metrics, client logs) in the application-specific time-series database 90. In additional embodiments, the data may be organized based on particular retention periods (e.g., how long the data is intended to be kept in the application-specific time-series database 90). That is, defining retention periods may help regulate the amount of data stored in the application-specific time-series database 90 during periods of time. Additionally, storing the organized data in an application-specific time-series database 90 provides ease in querying the data and performing trend analyses. The data in the application-specific time-series database 90 may be analyzed for boundary conditions based on determining correlations between the first (e.g., data from industrial components 62) and second (e.g., data relation to application-specific metrics of the MES) sets of data (block 178).

By analyzing collected data with respect to particular time periods, the aggregate monitoring system 40 may correlate certain operational issues (e.g., slowdown, low memory) of certain industrial components 62 to certain input parameters (e.g., number of orders, parallel orders, speed) that are associated with the industrial components 62. The common time-based storage of collected data, which may include systems metrics health data, as well as log data, may allow the aggregate monitoring system 40 to correlate adverse events or boundary conditions to other data points stored in the time series database to better ascertain a possible cause for the adverse event or boundary condition. As mentioned above, boundary conditions may be defined as a threshold conditions (e.g., maximum or minimum values) associated with operating parameters of the industrial component 62 in its corresponding MES. Adverse events may occur when the industrial component 62 fails to operate within boundary conditions.

In some embodiments, the boundary conditions may be predefined by a vendor of a software component in the system 80 or by the aggregate monitoring system 40. In other embodiments, the boundary conditions may be identified based on results or issues associated with previously conducted performance tests with respect to the system 80. The boundary conditions may be set by analyzing a history or record of data collected from conducting performance tests or input parameters from previous time periods. For example, if an average resource usage for one month was approximately 60%, then the boundary condition for a subsequent month may be set such that the average resource usage for the subsequent month does not have a value that is a threshold percentage (e.g., 10%) greater than the value of the previous month. In additional embodiments, the boundary conditions may be identified based on the availability or parameters of software and hardware resources. For example, a boundary condition may be defined based on the maximum amount of memory associated with a hardware component in the system 80.

As data associated with each new MES emerges, the application-specific time-series 90 is updated to include industrial component 62 data and corresponding application-specific metrics data for each new MES. At block 180, the aggregate monitoring system 40 retrieves the updated data from the application-specific time-series database 90. The aggregate monitoring system 40 determines whether the updated data is within boundary conditions (block 182). If the updated data is within boundary conditions, then the aggregate monitoring system 40 continues to receive data from the industrial components 62 and data related to corresponding application-metrics for each new MES.

However, if the updated data indicates that the industrial components 62 with respect to their corresponding MES fail to operate within boundary conditions, then the aggregate monitoring system 40 may send an alert of a notification 92 to the user device 94 regarding the boundary condition (block 184). In some embodiments, the aggregate monitoring system 40 may proactively prevent certain operations (e.g., adjusting operations of the industrial components 162 or MES) from being performed to prevent a particular boundary condition from being approached (block 186).

By way of example, the method 170 may be employed by the aggregate monitoring system 40 to identify a boundary condition noting that the industrial component 62 is less effective (e.g., fails) after more than 100 users are logged in. In this example, the aggregate monitoring system 40 may determine that hard disk space is below a threshold when the number of users logged in via a remote server exceeds 100. Keeping the method 170 described above in mind, h and disk space may correspond to the data from an industrial component 62 (e.g., storage of a machine 64) while the number of users logged in may be associated with an application-specific metric of the MES. In this case, the aggregate monitoring system 40 may detect the trend of the loss of disk space while the remote user logins increase. That is, if the aggregate monitoring system 40 monitors the disk usage and also the number of logged in users, as an application-specific metric, then the monitor system could help detect the correlation between the decrease in disk space and the increase in the number of users before it leads to the current issue or approaches a boundary condition.

In addition to the example provided above, the aggregate monitoring system 40 may resolve issues arising out of practices or operational procedure that cause a problem to escalate. For instance, if the MES is operating such that production orders are left open indefinitely, while other organizations close orders in 2-3 days, the long running orders may cause the MES to experience several issues that lead to problems with operating the MES or industrial components 62 in the MES. In some embodiments, the aggregate monitoring system 40 may detect the increasing duration of order consumptions and productions and correlate the respective data to how long the order is open. Increasing the load on the system caused by the increased durations may be attributed to timeouts experienced by the MES. The timeouts experienced by the MES may be due to the lack of memory stemming from a memory leak that occurs in situations when an order is kept open for an amount of time that exceeds some threshold or boundary condition. With the aggregate monitoring system 40 in place, the increase in consummation/production duration could have been detected and the memory leak could have been caught.

By employing the aggregate monitoring system 40 with respect to application-specific metrics, the aggregate monitoring system 40 may detect events and issues in industrial components 62 operating in the manufacturing application system 54 more efficiently. Moreover, the aggregate monitoring system 40 may control operations of the industrial components 62 to limit their respective operations in view of the detected events or boundary conditions. Further, the aggregate monitoring system 40 may serve as a diagnostic tool that displays historical information related to data from industrial components 62 and application-specific metrics as well as providing insight as to why particular event may have been detected or boundary conditions may have been approached. The aggregate monitoring system 40 provides information related to system health, platform health, data integrity, license monitoring, security monitoring, and support maintenance. As discussed in FIG. 4, the aggregate monitoring system 40 may be equipped with the display 114. An example GUI that includes categories for server names corresponding to one or more manufacturing application systems 54, number and names of the industrial components 62, operating system associated with manufacturing application systems 54, comments, and the like.

Another example that involves the aggregate monitoring system 40 is collecting log files. It should be noted that the amount of time to gather collected log files used for debugging a detected issue may cause a delay for a technician to debug the issue. That is, depending on the nature of the issue, different log files may be used by different developers, who usually provide guidance on what data should be collected. By employing the method 170, the aggregate monitoring system 40 may determine the log data to acquire for analysis based on the application-specific metrics that are being performed. Indeed, the aggregate monitoring system 40 may have access to the logging information for multiple sources, such that the information can be correlated by time, and to the time of an incident or event. In this way, the aggregate monitoring system 40 enables certain organizations that do not have IT staff on site or that is available to avoid the delay in providing relevant log files to developers tasked with resolving the detected event. That is, sometimes the files are not in expected default locations, depending on how the product was installed, making it more difficult to find the desired log files. The collection of log data by the aggregate monitoring system 40 may help with the above-listed situations by amalgamating the output of the log files in the application-specific time-series database 90. For example, if a manufacturing application system 54 experiences intermittent network issues and does not have network monitoring in place, the logging capability of the aggregate monitoring system 40 would have been indicated at the time of the issue that there was a network problem.

By using the context of the application-specific parameters for the respective industrial system or manufacturing application system 54, the aggregate monitoring system 40 may be able to better assess a health state for each of the industrial components 62 in the various manufacturing application systems 54 because the health state is determined relative to the operations that the manufacturing applications systems 54 are designed to perform. In addition to monitoring the health state, the aggregate monitoring system 40 may also perform diagnostic analysis to determine a root cause of a detected health state based on the collected data and the context of the application-specific metrics. Moreover, the aggregate monitoring system 40 may perform predictive analysis operations to predict when an adverse event may arise based on the application-specific metrics and the data collected from industrial components 62 at earlier times or from other components that are part of separate manufacturing application systems 54.

In addition to monitoring the health of the industrial components 62, the present embodiments described herein may also enable the industrial components 62 and the computing systems monitoring the devices to operate more efficiently. That is, by avoiding operating in certain boundary conditions, the presently disclosed techniques enable devices to operate for longer durations of time under operating conditions that is sustainable for efficient processing.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
receiving, via a processor, a first set of data associated with a plurality of application-specific metrics corresponding to a plurality of manufacturing application systems, wherein the plurality of manufacturing application systems is configured to control one or more operations of one or more components configured to perform one or more industrial automation tasks, and wherein the plurality of application-specific metrics corresponds to one or more operating parameters associated with the one or more operations performed by the one or more components;
receiving, via the processor, a second set of data from the one or more components, wherein the second set of data comprises a plurality of measurements associated with the one or more operations;
determining, via the processor, one or more measurements of the plurality measurements associated with each of the plurality of application-specific metrics;
generating, via the processor, a third set of data based on the one or more measurements of the plurality of measurements associated with each of the plurality of application-specific metrics;
storing, via the processor, the third set of data in a database, wherein the third set of data comprises an indication of a relationship between the one or more measurements with respect to a respective application-specific metric of the plurality of application-specific metrics for each manufacturing application system of the plurality of manufacturing application systems;
determining, via the processor, one or more correlations between the first set of data and the second set of data;
identifying, via the processor, one or more boundary conditions for each of the third set of data, wherein the one or more boundary conditions are associated with the one or more operating parameters for the respective application-specific metric based on the one or more correlations between the first set of data and the second set of data, and wherein the one or more boundary conditions comprise a threshold range of the first set of data that indicates an unexpected operation of the second set of data;
analyzing, via the processor, the third set of data with respect to the one or more boundary conditions, wherein the one or more boundary conditions are associated with the one or more components operating according to the one or more operating parameters monitored by the one or more manufacturing application systems; and
sending, via the processor, one or more alerts to a computing device in response to the one or more components operating outside the one or more boundary conditions based on the analysis of the third data.

2. The method of claim 1, wherein the computing device is configured to generate one or more visualizations indicative of the one or more alerts.

3. The method of claim 1, wherein the second set of data comprises one or more log files comprising one or more operational parameters related to a central processing unit (CPU), an amount of memory, an amount of disk usage, an input/output (IO) throughput, a heap size, a thread count, a hypertext transfer protocol (HTTP) request count, a number of transactions per second, an average response time, a Java database connectivity (JDBC) connection count, a garbage collector, an amount of order, parallel unit procedure, or any combination thereof.

4. The method of claim 1, wherein the one or more manufacturing application systems comprises a manufacturing execution system (MES), a manufacturing operations management (MOM) system, or both.

5. The method of claim 1, wherein the one or more components comprise one or more sensors, one or more actuators, one or more controllers, one or more machines, or any combination thereof.

6. The method of claim 1, comprising detecting that the one or more components are operating outside the one or more boundary conditions based on one or more memory limitations associated with the one or more components, one or more processing time delays associated with the one or more components, one or more processing powers used by the one or more components, or any combination thereof.

7. The method of claim 1, wherein the third set of data comprises one or more health parameters of each of the components.

8. The method of claim 1, comprising determining the one or more boundary conditions based on the one or more correlations.

9. The method of claim 1, comprising adjusting the one or more operations associated with the one or more components or the one or more manufacturing application systems in response to the one or more components operating outside the one or more boundary conditions.

10. An industrial automation system, comprising:
a first set of data comprising a plurality of application-specific metrics corresponding to a plurality of manufacturing application systems, wherein the plurality of manufacturing application systems is configured to control one or more operations of one or more components configured to perform one or more industrial automation tasks, and wherein the plurality of application-specific metrics corresponds to one or more operating parameters associated with the one or more operations performed by the one or more components;
a second set of data from one or more components;
a database; and
a monitoring system comprising a processor configured to execute computer-executable instructions stored on a non-transitory computer-readable medium, wherein the computer-executable instructions, when executed, cause the processor to:
receive the first set of data and the second set of data, wherein the second set of data comprises a plurality of measurements associated with the one or more operations;
determine one or more measurements of the plurality measurements associated with each of the plurality of application-specific metrics;
generate a third set of data based on the one or more measurements of the plurality of measurements associated with each of the plurality of application-specific metrics;
store the third set of data in the database, wherein the third set of data comprises an indication of a relationship between the one or more measurements with respect to a respective application-specific metric of the plurality of application-specific metrics for each manufacturing application system of the plurality of manufacturing application systems;
determine one or more correlations between the first set of data and the second set of data;
identify one or more boundary conditions for each of the third set of data, wherein the one or more boundary conditions are associated with the one or more operating parameters for the respective application-specific metric based on the one or more correlations between the first set of data and the second set of data, and wherein the one or more boundary conditions comprise a threshold range of the first set of data that indicates an unexpected operation of the second set of data;
analyze the third set of data with respect to the one or more boundary conditions, wherein the one or more boundary conditions are associated with the one or more components operating according to the one or more parameters monitored by one or more manufacturing application systems of the plurality of manufacturing application system; and
adjust the one or more operations performed by the one or more components or the one or more manufacturing application systems in response to the one or more components operating outside the one or more boundary conditions based on the analysis of the third data.

11. The industrial automation system of claim 10, wherein the one or more parameters monitored by the one or more manufacture application systems comprise disk space, lag time, memory, processing power usage, latency, or any combination thereof.

12. The industrial automation system of claim 10, wherein the monitoring system is configured to receive the first set of data and the second set of data as a data export from an additional database communicatively coupled to an additional monitoring system locally connected to the one or more components.

13. The industrial automation system of claim 10, wherein the monitoring system is configured to:
perform trend analyses;
determine the one or more correlations based on the trend analyses; and
identify the one or more boundary conditions based on the one or more correlations.

14. The industrial automation system of claim 13, wherein the monitoring system is configured to use machine learning to perform the trend analyses, determine the one or more correlations, identify the one or more boundary conditions, predict one or more future events associated with the one or more boundary conditions, provide one or more recommendations to prevent the one or more future events, or any combination thereof.

15. The industrial automation system of claim 10, wherein the monitoring system assesses a health state of the one or more components based on the third set of data.

16. The industrial automation system of claim 10, wherein the monitoring system is configured to output an alert to a computing device of a user representative of an indication of the one or more boundary conditions or a recommendation to prevent approaching the one or more boundary conditions.

17. A non-transitory computer-readable medium, comprising computer-executable instructions that, when executed by one or more processors, cause the one or more processors to:
receive a first set of data associated with a plurality of application-specific metrics corresponding to a plurality of manufacturing application systems, wherein the plurality of manufacturing application systems is configured to control one or more operations of one or more components configured to perform one or more industrial automation tasks, and wherein the plurality of application-specific metrics correspond to one or more operating parameters associated with the operations performed by the one or more components;

receive a second set of data from the one or more components, wherein the second set of data comprises a plurality of measurements associated with the one or more operations;

determine one or more measurements of the plurality measurements associated with each of the plurality of application-specific metrics;

generate a third set of data based on the one or more measurements of the plurality of measurements associated with each of the plurality of application-specific metrics;

store the third set of data in a database, wherein the third set of data an indication of a relationship between the one or more measurements with respect to a respective application-specific metric of the plurality of application-specific metrics for each manufacturing application system of the plurality of manufacturing application systems;

determine one or more correlations between the first set of data and the second set of data;

identify one or more boundary conditions for each of the third set of data, wherein the one or more boundary conditions are associated with the one or more operating parameters for the respective application-specific metric based on the one or more correlations between the first set of data and the second set of data, and wherein the one or more boundary conditions comprise a threshold range of the first set of data that indicates an unexpected operation of the second set of data;

analyze the third set of data with respect to the one or more boundary conditions, wherein the one or more boundary conditions are associated with the one or more components operating according to one or more parameters monitored by one or more manufacturing application systems of the plurality of manufacturing application system; and send one or more alerts to a computing device in response to the one or more components operating outside the one or more boundary conditions based on the analysis of the third data.

18. The non-transitory computer-readable medium of claim 17, wherein the one or more processors adjust the one or more operations associated with the one or more components or the one or more manufacturing application systems in response to in response to the one or more components operating outside the one or more boundary conditions.

19. The non-transitory computer-readable medium of claim 17, wherein the one or more alerts correspond to a text notification or a graphical visualization.

20. The non-transitory computer-readable medium of claim 17, wherein the plurality of application-specific metrics comprise a lag time, an amount of memory, an amount of processing power usage, an amount of disk space, a measure of latency, or any combination thereof.

* * * * *